Patented June 29, 1937

2,085,063

UNITED STATES PATENT OFFICE 2,085,063

ORGANIC MERCURY COMPOUNDS

Carl N. Andersen, Watertown, Mass., assignor to Lever Brothers Company, a corporation of Maine No Drawing. Application December 7, 1934, Serial No. 756,476

7 Claims. (Cl. 260—13)

The present invention relates to the production of certain new organic mercury compounds, and more particularly to aromatic mercury derivatives of aromatic acids containing a saturated side chain to which the aromatic mercury radical is attached.

It is an object of my invention to produce new organic mercury compounds useful as germicides and for other therapeutic purposes.

I have discovered that if the essential radical of an aromatic mercury compound consisting of an aromatic nucleus to which mercury is directly attached is introduced into the side chain of an aromatic hydrocarbon containing a saturated side chain, compounds are produced which have extraordinarily high potency as antiseptics and germicides, and at the same time are characterized by relatively low toxicity and other desirable properties.

The compounds I have prepared may be described as having the general formula $(RHg)_x.R_1$, in which R represents an aromatic structure, to a carbon atom of which the mercury is directly attached; in which $x$ represents the number of RHg groups in the compound and is usually one, but may be more than one if there is more than one side chain or more than one hydrogen replaceable in a single side chain; and in which $R_1$ represents a radical composed of an aromatic nucleus to which is attached a saturated side chain which is linked to the RHg group through the replacement of one or more of the carboxyl hydrogen atoms of the side chain. While the words "group" or "groups" are used hereinafter, it is obvious that these words are to be understood as singular or plural depending on the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The aromatic hydrocarbon radical containing side chains, represented by $R_1$, may consist of the benzene nucleus and its substituted derivatives, or condensed nuclei such as the naphthene nucleus and its substituted derivatives, or interconnected nuclei such as the diphenyl nucleus and its derivatives, attached to which is the saturated side chain. The side chain also may be substituted. The side chain contains a carboxyl group, the hydrogen of which is replaceable. There may be more than one side chain attached to the aromatic nucleus.

Examples of these side chain compounds are:
Mandelic acid, $C_6H_5CHOHCOOH$;
Tropic acid, $C_6H_5CHCH_2OHCOOH$;
Phenylacetic acid, $C_6H_5CH_2COOH$;
Hydrocinnamic acid, $C_6H_5CH_2CH_2COOH$;
Naphthlacetic acid, $C_{10}H_7CH_2COOH$;
Diphenylacetic acid, $(C_6H_5)_2CHCOOH$.

I have investigated many of the compounds of the above defined class and have prepared a sufficiently representative number of these compounds to lead me to believe that all of the acidic side chain aromatic compounds of the above identified group can be employed to produce my novel mercury compounds, and that the compounds so prepared have, in greater or lesser, but always in relatively high degree, desirable antiseptic and germicidal properties. I therefore regard my invention as generic to and including the entire above defined class.

In my applications Serial Nos. 694,198 and 694,199, filed October 18, 1933, I have shown that the aromatic mercury radical may be united with an organic acid by replacing the hydrogen of the COOH group with the aromatic mercury radical. These general methods may be used in preparing the above described compounds.

The following specific examples are given as illustrative of the methods which may be employed in producing my novel compounds, and as illustrative of representative organic mercury derivatives of side chain compounds falling within the scope of my invention.

*Example 1*

17.64 grams of phenylmercury hydroxide is dissolved in four liters of water and heated until solution is complete. The solution is filtered to remove any insoluble material or gum. To the filtrate is added 10.03 grams of mandelic acid dissolved in 400 cc. of water. A precipitate results. The mixture is allowed to cool for several hours and then filtered. It is washed well with warm water and dried. The compound is phenylmercury mandelate and melts at 198° C.

*Example 2*

17.64 grams of phenylmercury hydroxide is dissolved in four liters of water and heated until solution is complete. The mixture is then filtered to remove any insoluble material. To the filtrate is added 10.95 grams of tropic acid dissolved in 200 cc. of alcohol. On cooling, beautiful white sparkling crystals separate, which are separated by filtration, washed well with warm water and a few cc. of alcohol, and dried. The material melts at 120° C. and is the compound phenylmercury tropate.

*Example 3*

17.64 grams of phenylmercury hydroxide is dissolved in 4 liters of water and heated until solution is complete. The solution is then filtered to remove any insoluble material. To the filtrate is added an alcoholic solution containing 8.97 grams of phenylacetic acid. A white precipitate results which is separated by filtration, washed well with warm water, and dried. The material is recrystallized from alcohol and melts at 153–154° C. The compound is phenylmercury phenylacetate.

*Example 4*

17.64 grams of phenylmercury hydroxide is dissolved in 4 liters of water and heated until solution is complete. The solution is then filtered to remove any insoluble material. To the filtrate is added an alcoholic solution containing 9.9 grams of hydrocinnamic acid. A white precipitate results and the mixture is allowed to stand and cool after which it is filtered. The precipitate is washed well with water and alcohol, and dried. It has a sharp melting point of 118° C. and is the compound phenylmercury hydrocinnamate (beta-phenyl phenylmercury propionate).

The reacting materials are employed in substantial theoretical quantities. In some cases, if desired, approximately 10% excess of the side chain compound may be employed in order to assure the complete conversion of the aromatic mercury compound.

Water is generally used as a medium for carrying out the reaction for reasons of convenience if the reacting components are water soluble, but if not, any suitable solvent in which the reacting components are soluble may be used, for example, the alcohols, acetone or mixture of these with each other or with water. The process may be carried out at any temperature, for example, room temperature. In most cases I find, however, that the use of heat facilitates the solution of the reacting components and speeds the reaction.

From the description of the specific examples, it will be readily apparent to one skilled in the art how other members of the above identified group may be reacted with an aromatic mercury compound to produce mercury compounds of analogous structure.

All of the compounds produced as above described are characterized by extraordinarily high potency as germicides. Tests to determine their efficacy in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, December 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given merely as illustrative:

The figures represent the maximum dilutions at which killing in 15 minutes resulted:

|  | B. typhosus | Staph. aureus |
|---|---|---|
| Phenylmercury mandelate | 1:50,000 | 1:20,000 |
| Phenylmercury hydrocinnamate | 1:60,000 | 1:30,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally, and in some cases administered internally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic compound of the general formula $RHg.R_1$ in which R represents an aromatic structure to a carbon atom of which the mercury is directly attached and in which none of the carbon atoms has direct linkage with any elements other than hydrogen, carbon and mercury; and in which $R_1$ represents a radical comprising an aromatic nucleus to which is attached a saturated side chain containing a COOH group to which the RHg group is linked by the replacement of the hydrogen atom of the COOH group.

2. A new organic compound of the general formula $RHg.R_1$ in which R represents an aromatic structure to a carbon atom of which the mercury is directly attached and in which none of the carbon atoms has direct linkage with any elements other than hydrogen, carbon and mercury; and in which $R_1$ represents a radical comprising a benzene nucleus to which is attached a saturated side chain containing a COOH group to which the RHg group is linked by the replacement of the hydrogen atom of the COOH group.

3. A new organic compound of the general formula $C_6H_5Hg.R_1$ in which $R_1$ represents a radical comprising an aromatic nucleus to which is attached a saturated side chain containing a COOH group to which the RHg group is linked by the replacement of the hydrogen atom of the COOH group.

4. A new organic compound of the general formula $C_6H_5Hg.R_1$ in which $R_1$ represents a radical comprising an aromatic nucleus to which is attached a saturated side chain containing a COOH group to which the RHg group is linked by the replacement of the hydrogen atom of the COOH group.

5. Phenylmercury mandelate.
6. Phenylmercury tropate.
7. Phenylmercury phenylacetate.

CARL N. ANDERSEN.